US012659748B2

(12) United States Patent
Ficara et al.

(10) Patent No.: US 12,659,748 B2
(45) Date of Patent: Jun. 16, 2026

(54) DETECTING MiTM VIA FTM

(71) Applicant: Cisco Technology, Inc., San Jose, CA (US)

(72) Inventors: Domenico Ficara, Essertines-sur-Yverdon (CH); Amine Choukir, Ecublens (CH); Pascal Thubert, Roquefort les Pins (FR); Jerome Henry, Pittsboro, NC (US); Shree N. Murthy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 297 days.

(21) Appl. No.: 18/457,085

(22) Filed: Aug. 28, 2023

(65) Prior Publication Data

US 2025/0080988 A1 Mar. 6, 2025

(51) Int. Cl.
*H04W 12/128* (2021.01)

(52) U.S. Cl.
CPC .................................. *H04W 12/128* (2021.01)

(58) Field of Classification Search
CPC ... H04W 12/10; H04W 12/12; H04W 12/121; H04W 12/122; H04W 12/128; H04W 12/30; H04L 63/20; H04L 63/1466
See application file for complete search history.

(56) References Cited

U.S. PATENT DOCUMENTS

| | | | | |
|---|---|---|---|---|
| 10,330,784 | B2 * | 6/2019 | Cavendish | ............ H04W 84/12 |
| 10,477,349 | B2 * | 11/2019 | Sinha | ...................... H04W 8/18 |
| 10,966,084 | B2 * | 3/2021 | Sun | ........................ H04L 9/3236 |
| 11,726,173 | B2 * | 8/2023 | Sheriff | ...................... G01S 7/36 |
| | | | | 342/14 |
| 11,974,351 | B2 * | 4/2024 | Dees | ..................... H04W 76/11 |
| 2015/0222602 | A1 | 8/2015 | Steiner et al. | |
| 2017/0257758 | A1 | 9/2017 | Aldana et al. | |
| 2021/0258773 | A1 | 8/2021 | Henry et al. | |
| 2021/0364597 | A1 | 11/2021 | Sheriff et al. | |
| 2022/0146619 | A1 * | 5/2022 | Bernsen | ................ G01S 5/0205 |
| 2022/0303776 | A1 | 9/2022 | Beaudin et al. | |

* cited by examiner

*Primary Examiner* — Hosuk Song
(74) *Attorney, Agent, or Firm* — Patterson + Sheridan, LLP

(57) ABSTRACT

Techniques for detecting and/or confirming a Man-in-The-Middle (MiTM) attack using Fine Timing Measurement (FTM) are provided. In one aspect, a FTM exchange is initiated between a second station and a first station to detect or confirm a MiTM attack in a network in which a MiTM is positioned between the first station and a third station. The MiTM attack is detected or confirmed, or both, based at least in part on FTM information determined during the FTM exchange.

20 Claims, 8 Drawing Sheets

DETECTING MiTM VIA FTM

TECHNICAL FIELD

Embodiments presented in this disclosure generally relate to protecting the integrity of wireless network communications. More specifically, embodiments disclosed herein provide techniques for detecting Man-in-The-Middle (MiTM) attacks.

BACKGROUND

Man-in-The-Middle (MiTM) attacks can compromise data-security and expose entities and individuals to data breaches. In some scenarios, MiTM attackers can place themselves in the middle between a client and an Access Point (AP) on a network. A MiTM attacker can pretend to be the other party in each of the links. That is, a MiTM attacker can pretend to be the AP with the client and can pretend to be the client with the AP. MiTM attackers can use various techniques to slip detection and carry out nefarious acts, such as by using different channels on the two sides of the communication, forging rather relaying frames, etc. Accordingly, detecting MiTM attackers has presented certain challenges.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method. The method includes initiating a fine timing measurement (FTM) exchange between a second station and a first station to detect or confirm a man-in-the-middle (MiTM) attack in a network in which a MiTM is positioned between the first station and a third station. The method also includes detecting or confirming, or both, the MiTM attack based at least in part on FTM information determined during the FTM exchange.

Another embodiment presented in this disclosure is a non-transitory, computer readable medium. The non-transitory, computer readable medium includes instructions that, when executed by one or more processors, cause the one or more processors to perform an operation, the operation includes initiating a fine timing measurement (FTM) exchange between a second station and a first station to detect or confirm a man-in-the-middle (MiTM) attack in a network in which a MiTM is positioned between the first station and a third station; and detecting or confirming, or both, the MiTM attack based at least in part on FTM information determined during the FTM exchange.

Yet another embodiment presented in this disclosure is a station. The station includes a processor and a memory storing a program executable by the processor to perform an operation. The operation includes initiating a fine timing measurement (FTM) exchange between the station and a first station to detect or confirm a man-in-the-middle (MiTM) attack in a network in which a MiTM is positioned between the first station and a third station; and detecting or confirming the MiTM attack based at least in part on FTM information associated with the FTM exchange, the FTM information being transmitted over a distribution system between the station and the first station or a controller associated with the first station.

Example Embodiments

Embodiments presented herein provide techniques for detecting and/or confirming a Man-in-The-Middle (MiTM) attack. Specifically, techniques for detecting a MiTM attack using Fine Timing Measurement (FTM) are provided. FTM is an IEEE 802.11 protocol used to estimate a distance between two stations (STAs), such as between two Access Points (APs). The MiTM detection techniques disclosed herein utilize FTM, and specifically information learned or recorded during a FTM exchange, to detect and/or confirm a MiTM attack. Such MiTM detection techniques can advantageously detect and/or confirm a MiTM attack reliably despite the MiTM attacker being capable of exhibiting many different behaviors.

Figure 1:
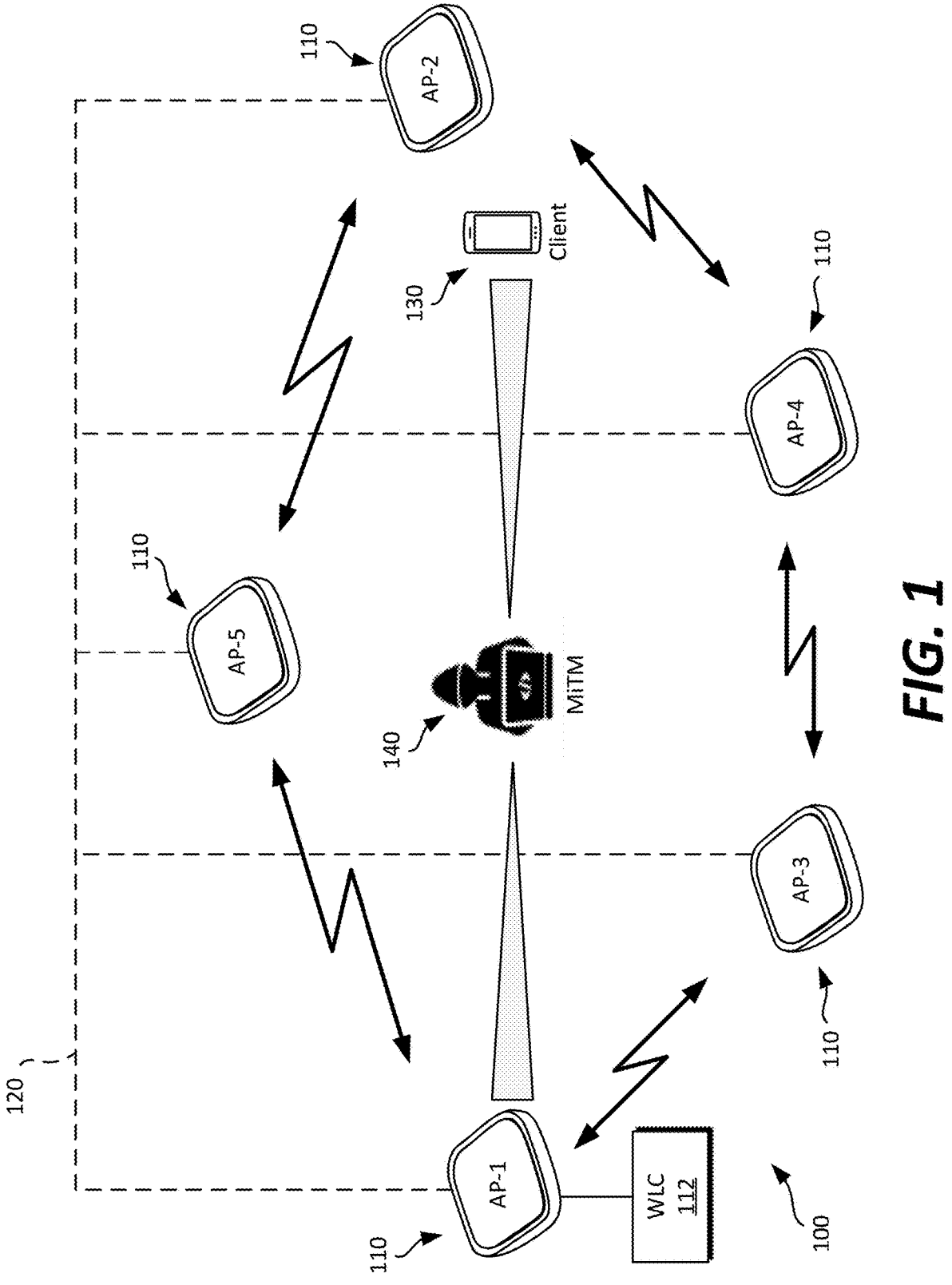
FIG. 1 is a schematic diagram of an example network showing a Man-in-The-Middle (MiTM) attack according to one or more embodiments.

FIG. 1 is a schematic diagram of an example network 100 according to one or more embodiments. In the depicted embodiment of FIG. 1, the network 100 is configured as an IEEE 802.11 Wireless Local Area Network (WLAN), which can be connected with a Wide Area Network, such as the internet. The network 100 includes a plurality of stations (STAs), including a plurality of Access Points (APs), or APs 110, and one or more clients, represented by client 130 in FIG. 1. In FIG. 1, the APs 110 include a first access point AP-1, a second access point AP-2, a third access point AP-3, a fourth access point AP-4, and a fifth access point AP-5. In other embodiments, the network 100 can include more or less than five APs. One or more of the APs 110 can have an associated controller, such as a Wireless Local area network Controller (WLC). For instance, in FIG. 1, the first access point AP-1 has an associated WLC 112. In some instances, the WLC 112 can assist the first access point AP-1 in performing operations. Although not depicted, one, some, or all of the other APs 110 can have associated WLC. In some instances, a WLC can serve multiple APs 110.

The APs 110 can be communicatively coupled (directly or indirectly) with one another via a medium of the network 100. In addition, the APs 110 can be communicatively coupled with one another via a Distribution System (DS), or DS 120, as depicted by the dashed lines in FIG. 1. In this regard, the APs 110 can communicate with one another over the network and/or the DS 120. The DS 120 can include one or more wired and/or wireless communication links that communicatively couple the APs 110.

The APs 110 can wirelessly serve one or more clients, including the client 130 in FIG. 1. As used herein, a client is a non-AP station that is wirelessly served by one or more APs. A client can be, without limitation, a smart phone, tablet, laptop, computer, Internet of Things (IoT) device, or any other electronic device configured to communicate wirelessly with one or more of the APs 110. In FIG. 1, the client 130 is depicted as a smart phone.

As shown in FIG. 1, a MiTM attacker 140 is positioned between the first access point AP-1 and the client 130, e.g., during a session. The MiTM attacker 140, or spoofing station, is impersonating the first access point AP-1 when communicating with the client 130. Left undetected and without mitigation, the MiTM attacker 140 can perform nefarious acts, which can lead to data and/or security breaches, among other undesirable consequences. The presence of the MiTM attacker 140 can affect measured timers and Location Configuration Identifiers (LCI) when Fine Timing Measurement (FTM) is executed between the first access point AP-1 and the client 130. In the FTM-enabled network 100 of FIG. 1, the client 130 can also be in proximity to some other valid AP, e.g., the second access point AP-2 in FIG. 1, which can overhear the exchanges between the first access point AP-1 and the client 130.

In accordance with inventive aspects of the present disclosure, techniques are provided herein for detecting MiTM attacks, such as the MiTM attack carried out by the MiTM attacker 140 in FIG. 1. More specifically, the techniques provided herein utilize FTM exchanges for detection of MiTM attacks. For instance, in one example aspect, a FTM exchange can be initiated between the second access point AP-2 and the first access point AP-1 to detect and/or confirm a MiTM attack in the network 100. The MiTM attacker 140 can be positioned between the first access point AP-1 and the client 130, e.g., as shown in FIG. 1, and notably, the client 130 is located such that the second access point AP-2 overhears communication exchanges between the first access point AP-1 and the client 130. The MiTM attack can be detected and/or confirmed based at least in part on FTM information associated with the FTM exchange, with the FTM information being transmitted over the distribution system 120 between the second access point AP-2 and the first access point AP-1 or the WLC 112 associated with the first access point AP-1. Once a MiTM attack is detected and/or confirmed, MiTM remediation techniques can be performed, e.g., to remove the MiTM attacker 140 and/or mitigate the damage, if any, caused by the MiTM attacker 140. For instance, the second access point AP-2 can overload or contain the MiTM attacker 140, duplicate the invalid responses from the first access point AP-1 with spoofed responses with large bias to cause the client 130 and other STAs to ignore the invalid first access point AP-1 (or MiTM attacker 140), and/or other protection measures can be activated while an alarm is raised about the presence of the MiTM attacker 140.

Example embodiments are provided below that provide further details on the MiTM detection techniques using FTM. To provide context to the inventive concepts described below, FIG. 1 and elements thereof are referenced.

Figure 2:
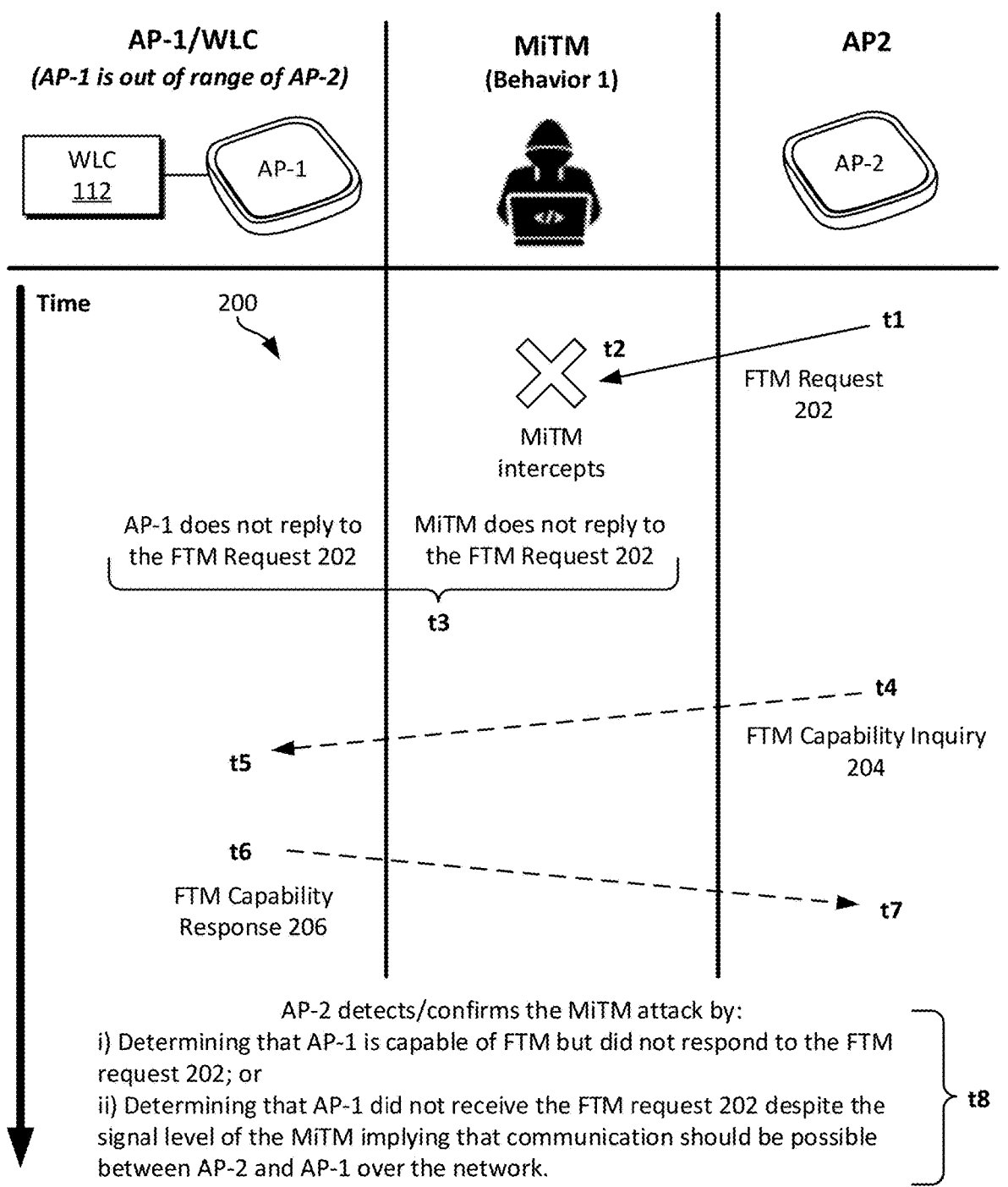
FIG. 2 is a communication timing diagram illustrating a MiTM detection technique using Fine Timing Measurement (FTM) according to a first detection implementation to detect a MiTM exhibiting a first behavior.

FIG. 2 is a communication timing diagram illustrating a MiTM detection technique using FTM according to a first detection implementation to detect a MiTM exhibiting a first behavior. In this scenario, the first access point AP-1 is out of range of the second access point AP-2.

In accordance with the first detection implementation, at time t1, the second access point AP-2 sends a FTM request 202 to the first access point AP-1 and/or the WLC 112 to initiate a FTM exchange 200. The second access point AP-2 can initiate the FTM exchange 200 with the first access point AP-1, e.g., in response to a FTM trigger condition or as part of a routine implementation of a FTM protocol. As one example FTM trigger condition, the second access point AP-2 can overhear the exchange between the first access point AP-1 and the client 130 and determine that strange activity has occurred. As another example FTM trigger condition, a MiTM attacker can return a Location Configuration Identifier (LCI) value, in the name of the first access point AP-1, that the second access point AP-2 (or a WLC associated with the second access point AP-2) recognizes as being invalid for that AP. As yet another example FTM trigger condition, the MiTM attacker can pretend to be an additional AP on the network, and the second access point AP-2 can recognize the "additional AP" as being invalid. As a further example FTM trigger condition, the timers exchanged and overheard by the second access point AP-2 can be incompatible with the current position of the first access point AP-1. Other FTM trigger conditions are possible. In other embodiments, the FTM exchange 200 can be initiated based on a routine implementation of a FTM protocol, which can occur repeatedly, at intervals, via a random sampling algorithm, etc.

At time t2, the MiTM attacker 140 intercepts the FTM request 202 sent to the first access point AP-1 and/or the WLC 112 by the second access point AP-2. As a result, the first access point AP-1 does not receive the FTM request 202. Consequently, at time t3, neither the first access point AP-1 nor the WLC 112 responds to the FTM request 202, or rather, neither the first access point AP-1 nor the WLC 112 sends a FTM request response (e.g., an acknowledgment) to the second access point AP-2 confirming receipt of the FTM request 202. Further, in accordance with the first behavior of the MiTM attacker 140, at time t3, the MiTM attacker 140 does not reply to the FTM request 202, or stated another way, the MiTM attacker 140 does not impersonate the first access point AP-1 by sending an acknowledgement of the FTM request 202 to the second access point AP-2.

At time t4, when no response to the FTM request 202 is received by the second access point AP-2 and the first access point AP-1 is out of range of the second access point AP-2, the second access point AP-2 checks the FTM capability of the first access point AP-1 over the DS 120. Particularly, the second access point AP-2 requests, from the first access point AP-1 and/or the WLC 112 over the DS 120, a FTM capability inquiry 204. As used herein, communications that are sent over the DS 120 are represented by dashed lines and those sent over the medium of the network 100 are not.

In some instances, as shown in FIG. 2, at time t5, the first access point AP-1 can receive the FTM capability inquiry 204, and at time t6, the first access point AP-1 can send a FTM capability response 206 to the second access point AP-2, over the DS 120, indicating that the first access point AP-1 did not receive the FTM request 202. The second access point AP-2 can receive the FTM capability response 206 at time t7. In other instances, after the FTM capability inquiry 204 is sent to the first access point AP-1 and/or the WLC 112 over the DS 120, the first access point AP-1 does not receive the FTM capability inquiry 204. Consequently, the second access point AP-2 does not receive the FTM capability response 206.

Accordingly, at time t8, the MiTM attack is detected and/or confirmed in response to the second access point AP-2 i) determining that the first access point AP-1 is capable of FTM and thus should have replied to the FTM request 202, but did not (as indicated by the second access point AP-2 not receiving a response to the FTM request 202 and the FTM capability response 206 indicating that the first access point AP-1 is capable of FTM); and/or ii) determining that the first access point AP-1 did not receive the FTM request 202 (as confirmed over the DS 120 by way of the FTM capability response 206) despite a signal level of the MiTM implying that communication exchanges between the second access point AP-2 and the first access point AP-1 should be possible over the network 100. Thus, FTM information associated with the FTM exchange 200 is used according to the first detection implementation to detect the MiTM attacker 140 exhibiting a first behavior.

Figure 3:
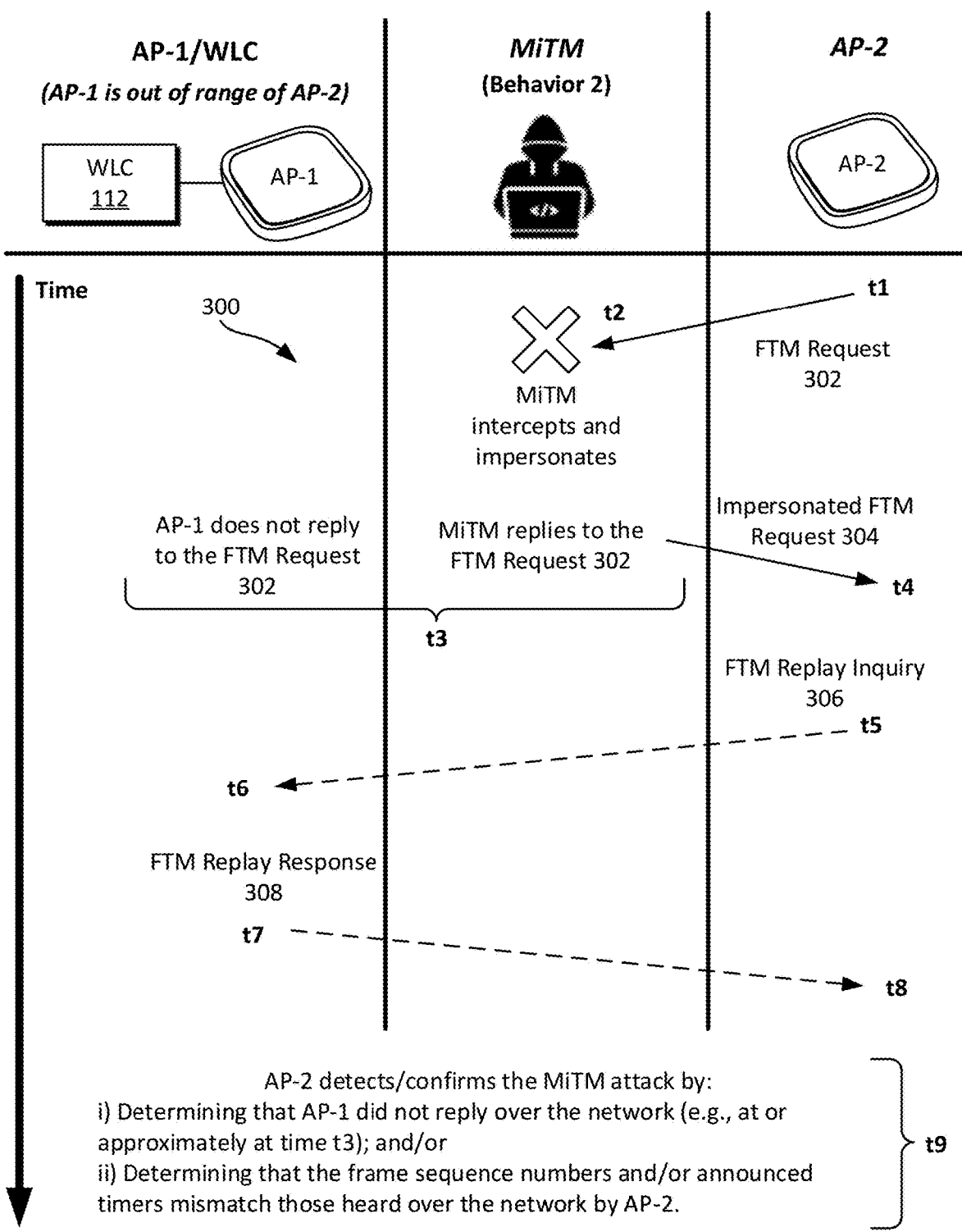
FIG. 3 is a communication timing diagram illustrating a MiTM detection technique using FTM according to a second detection implementation to detect a MiTM exhibiting a second behavior.

FIG. 3 is a communication timing diagram illustrating a MiTM detection technique using FTM according to a second detection implementation to detect a MiTM exhibiting a second behavior. In this scenario, the first access point AP-1 is out of range of the second access point AP-2.

In accordance with the second detection implementation, at time t1, the second access point AP-2 sends a FTM request 302 to the first access point AP-1 and/or the WLC 112 to initiate a FTM exchange 300. The second access point AP-2 can initiate the FTM exchange 300 with the first access point AP-1, e.g., based at least in part on one or more of the ways disclosed herein.

At time t2, the MiTM attacker 140 intercepts the FTM request 302 sent to the first access point AP-1 and/or the WLC 112 by the second access point AP-2. As a result, the first access point AP-1 does not receive the FTM request 302 at time t3. Moreover, at time t3, the MiTM attacker 140 impersonates the first access point AP-1 and replies to the FTM request 302 by sending an acknowledgement, or an impersonated FTM response 304, to the second access point AP-2. The acknowledgement sent to the second access point AP-2 by the MiTM attacker 140 is sent with the intention of tricking the second access point AP-2 into believing the first access point AP-1 has received the FTM request 302 and responded with an acknowledgement or according to FTM protocol. At time t4, the second access point AP-2 receives the impersonated FTM response 304 from the MiTM attacker 140.

At time t5, when a response to the FTM request 302 is received by the second access point AP-2 (the response being the impersonated FTM response 304 from the MiTM attacker 140 in this instance), and the first access point AP-1 is out of range of the second access point AP-2, the second access point AP-2 requests, from the first access point AP-1 and/or the WLC 112 over the DS 120, a FTM replay inquiry 306. The FTM replay inquiry 306 is a request of a replay of timers and/or frame sequence numbers exchanged over the network 100 that are associated with the FTM exchange. At time t6, the first access point AP-1 and/or WLC 112 receives the FTM replay inquiry 306.

At time t7, the first access point AP-1 and/or WLC 112 sends, over the DS 120, a FTM replay response 308 to the second access point AP-2. The FTM replay response 308 includes, among other possible information, a replay of timers and/or frame sequence numbers exchanged over the network 100 that are associated with the FTM exchange. At time t8, the second access point AP-2 receives the FTM replay response 308.

Accordingly, at time t9, the MiTM attack is detected and/or confirmed in response to the second access point AP-2 determining, based at least in part on the FTM replay response 308, that i) the first access point AP-1 did not actually respond over the network 100 in response to the FTM request 302 (e.g., at or approximately at time t3), as indicated by the FTM replay response 308 indicating that the first access point AP-1 does not contain frames or timers indicating a response to the FTM request 302 was sent by the first access point AP-1; and/or ii) that the frame sequence numbers and/or announced timers mismatch those heard over the network 100 by the second access point AP-2. Thus, FTM information associated with the FTM exchange 300 is used according to the second detection implementation to detect the MiTM attacker 140 exhibiting a second behavior.

Figure 4:
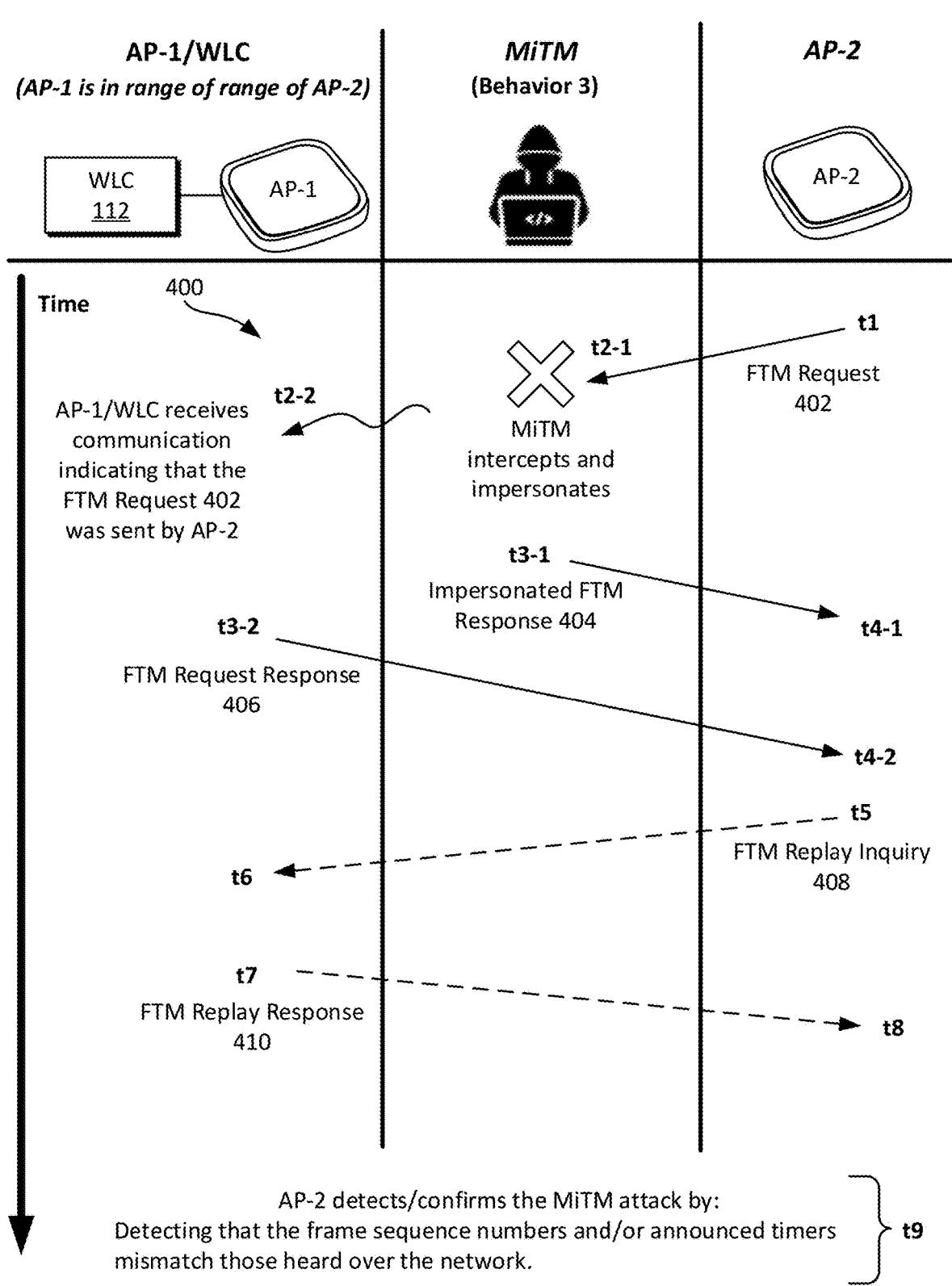
FIG. 4 is a communication timing diagram illustrating a MiTM detection technique using FTM according to a third detection implementation to detect a MiTM exhibiting a third behavior.

FIG. 4 is a communication timing diagram illustrating the MiTM detection technique using FTM according to a third detection implementation to detect a MiTM exhibiting a third behavior. In this scenario, the first access point AP-1 is in range of the second access point AP-2.

In accordance with the third detection implementation, at time t1, the second access point AP-2 sends a FTM request 402 to the first access point AP-1 and/or the WLC 112 to initiate a FTM exchange 400. The second access point AP-2 can initiate the FTM exchange 400 with the first access point AP-1, e.g., based at least in part on one or more of the ways disclosed herein.

At time t2-1, the MiTM attacker 140 intercepts the FTM request 402 sent to the first access point AP-1 and/or the WLC 112 by the second access point AP-2. However, at time t2-2, the first access point AP-1 and/or the WLC receives a communication that the FTM request 402 was sent by the second access point AP-2 as the second access point AP-2 is in range of the first access point AP-1. The communication can be the FTM request 402 itself, a copy of the FTM request 402, or any communication indicating that the second access point AP-2 sent the FTM request 402 to the first access point AP-1. For instance, another STA in range of both the first access point AP-1 and the second access point AP-2 can send a communication to the first access point AP-1 that the second access point AP-2 sent a FTM request 402 to the first access point AP-1. In this way, despite the MiTM attacker 140 intercepting the FTM request 402, the first access point AP-1 is notified that the second access point AP-2 sent the FTM request 402.

At time t3-1, the MiTM attacker 140 impersonates the first access point AP-1 and replies to the FTM request 402 by sending an acknowledgement, or an impersonated FTM response 404, to the second access point AP-2. The acknowledgement sent to the second access point AP-2 by the MiTM attacker 140 is sent with the intention of tricking the second access point AP-2 into believing the first access point AP-1 has received the FTM request 402 and responded with an acknowledgement or according to FTM protocol. At time t4-1, the second access point AP-2 receives the impersonated FTM response 404 from the MiTM attacker 140. In addition, at time t3-2, the first access point AP-2 and/or the WLC 112 replies to the FTM request 402 by sending an acknowledgement, or FTM request response 406, to the second access point AP-2. At time t4-2, the second access point AP-2 receives the FTM request response 406 from the first access point AP-1. Thus, the second access point AP-2 receives two responses to the FTM request 402, including the impersonated FTM response 404 and the FTM request response 406 from the first access point AP-1.

At time t5, when a response to the FTM request 402 is received by the second access point AP-2 from the MiTM attacker 140 and from the first access point AP-1, and with the first access point AP-1 in range of the second access point AP-2, the second access point AP-2 requests, from the first access point AP-1 and/or the WLC 112 over the DS 120, a FTM replay inquiry 408. The FTM replay inquiry 408 is a request of a replay of timers and/or frame sequence numbers exchanged over the network 100 that are associated with the FTM exchange. At time t6, the first access point AP-1 and/or WLC 112 receives the FTM replay inquiry 408.

At time t7, the first access point AP-1 and/or WLC 112 sends, over the DS 120, a FTM replay response 410 to the second access point AP-2. The FTM replay response 410 includes, among other possible information, a replay of timers and/or frame sequence numbers exchanged over the network 100 that are associated with the FTM exchange. At time t8, the second access point AP-2 receives the FTM replay response 410.

Accordingly, at time t9, the MiTM attack is detected and/or confirmed in response to the second access point AP-2 determining, based at least in part on the FTM replay response 410, that the frame sequence numbers and/or announced timers mismatch those heard over the network 100. Thus, FTM information associated with the FTM exchange 400 is used according to the third detection implementation to detect the MiTM attacker 140 exhibiting a third behavior.

In some other embodiments, when a response to the FTM request 402 is received by the second access point AP-2 from the MiTM attacker 140 (e.g., the impersonated FTM response 404) and from the first access point AP-1 (e.g., the FTM request response 406), and the first access point AP-1 is in range of the second access point AP-2, the MiTM attack is detected or confirmed, or both, in response to the second access point AP-2 determining that multiple responses to the FTM request 402 have been received by the second access point AP-2. In such embodiments, further confirmation over the DS 120 (e.g., by way of the FTM replay inquiry 408 and FTM replay response 410) is optional.

Figure 5:
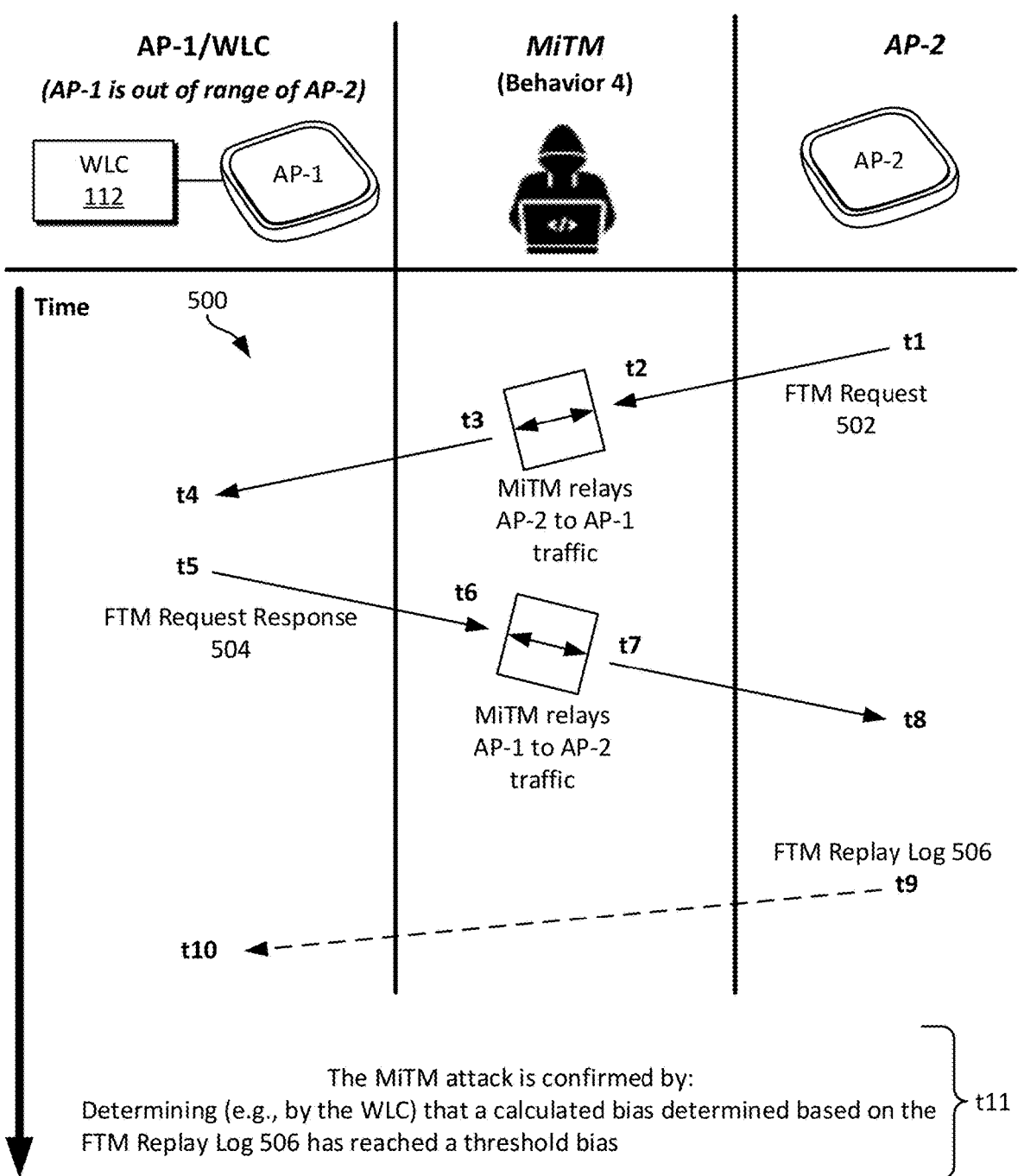
FIG. 5 is a communication timing diagram illustrating a MiTM detection technique using FTM according to a fourth detection implementation to detect a MiTM exhibiting a fourth behavior.

FIG. 5 is a communication timing diagram illustrating the MiTM detection technique using FTM according to a fourth detection implementation to detect a MiTM exhibiting a fourth behavior. In this scenario, the first access point AP-1 is out of range of the second access point AP-2.

In accordance with the fourth detection implementation, at time t1, the second access point AP-2 sends a FTM request 502 to the first access point AP-1 and/or the WLC 112 to initiate a FTM exchange 500. The second access point AP-2 can initiate the FTM exchange 500 with the first access point AP-1, e.g., based at least in part on one or more of the ways disclosed herein.

As depicted in FIG. 5, at time t2, the MiTM attacker 140 receives the FTM request 502 sent by the second access point AP-2, and at time t3, the MiTM attacker 140 relays the FTM request 502 to the first access point AP-1. At time t4, the first access point AP-1 receives the FTM request 502. In this regard, the first access point AP-1 receives the FTM request 502, albeit relayed from the MiTM attacker 140. At time t5, the first access point AP-1 sends a response to the FTM request 502, or rather a FTM request response 504, to the second access point AP-2. However, at time t6, the MiTM attacker 140 receives the FTM request response 504 sent by the first access point AP-2, and at time t7, the MiTM attacker 140 relays the FTM request response 504 to the second access point AP-2. At time t8, the second access point AP-2 receives the FTM request response 504. In this regard, the second access point AP-2 receives the FTM request response 504, albeit relayed from the MiTM attacker 140.

As the MiTM attacker 140 relays the frames in both directions, a processing and retransmission delay is introduced when the MiTM attacker 140 receives and retransmits the FTM request 502 and when the MiTM attacker 140 receives and transmits the FTM request response 504. Left uncorrected, a distance computed via FTM will be biased by this delay. For instance, an uncorrected time (e.g., an uncorrected processing and retransmission time) of 1 us can skew a FTM measurement (e.g., a measurement of distance between two STAs) significantly, e.g., by 300 meters. For this scenario, the MiTM attacker 140 exhibits the fourth behavior in which the MiTM attacker 140 does not take any initiative to process its transmission and retransmission delays. That is, the MiTM attacker 140 relays the traffic but does not correct for the transmission and retransmission delays associated with relaying the FTM request 502 or the FTM request response 504.

As further shown in FIG. 5, at time t9, when the FTM request 502 is relayed by the MiTM attacker 140 from the second access point AP-2 to the first access point AP-1 and the FTM request response 504 to the FTM request 502 is relayed by the MiTM attacker 140 from the first access point AP-1 to the second access point AP-2, and with the first access point AP-1 out of range of the second access point AP-2, the second access point AP-2 provides to the first access point AP-1 and/or the WLC 112, over the DS 120, a FTM replay log 506. The FTM replay log 506 includes a replay of timers and/or frame sequence numbers associated with the FTM exchange. Particularly, the FTM replay log 506 can include a replay of timers and/or frame sequence numbers associated with the FTM request 502 and/or a replay of timers and/or frame sequence numbers associated with the FTM request response 504 exchanged over the network 100 that were overheard by the second access point AP-2. At time t10, the first access point AP-1 and/or the WLC 112 receives the FTM replay log 506.

Accordingly, at time t11, the MiTM attack is detected and/or confirmed in response to the first access point AP-1 and/or WLC 112 determining that a calculated bias, which is determined based at least in part on the replay of timers and/or frame sequence numbers of the FTM replay log 506, has reached a threshold bias. Specifically, as mentioned above, in this scenario the MiTM attacker 140 has failed to correct the processing or retransmission delay associated with relaying the FTM request 502 or the processing or retransmission delay associated with relaying the FTM request response 504. Accordingly, when the first access point AP-1 and/or WLC 112 receives the FTM replay log 506 from the second access point AP-2, the first access point AP-1 and/or WLC 112 can compare its replay of timers and/or frame sequence numbers with the replay of timers and/or frame sequence numbers overheard by the second access point AP-2. From this comparison, the first access point AP-1 and/or WLC 112 can calculate a bias, such as determining a difference between the respective timers and/or respective frame sequence numbers. The calculated bias can then be compared to a threshold bias. When the calculated bias reaches the threshold bias, the presence of the MiTM attacker 140 can be detected and/or confirmed. Thus, FTM information associated with the FTM exchange 400 is used according to the fourth detection implementation to detect the MiTM attacker 140 exhibiting a fourth behavior.

Figure 6:
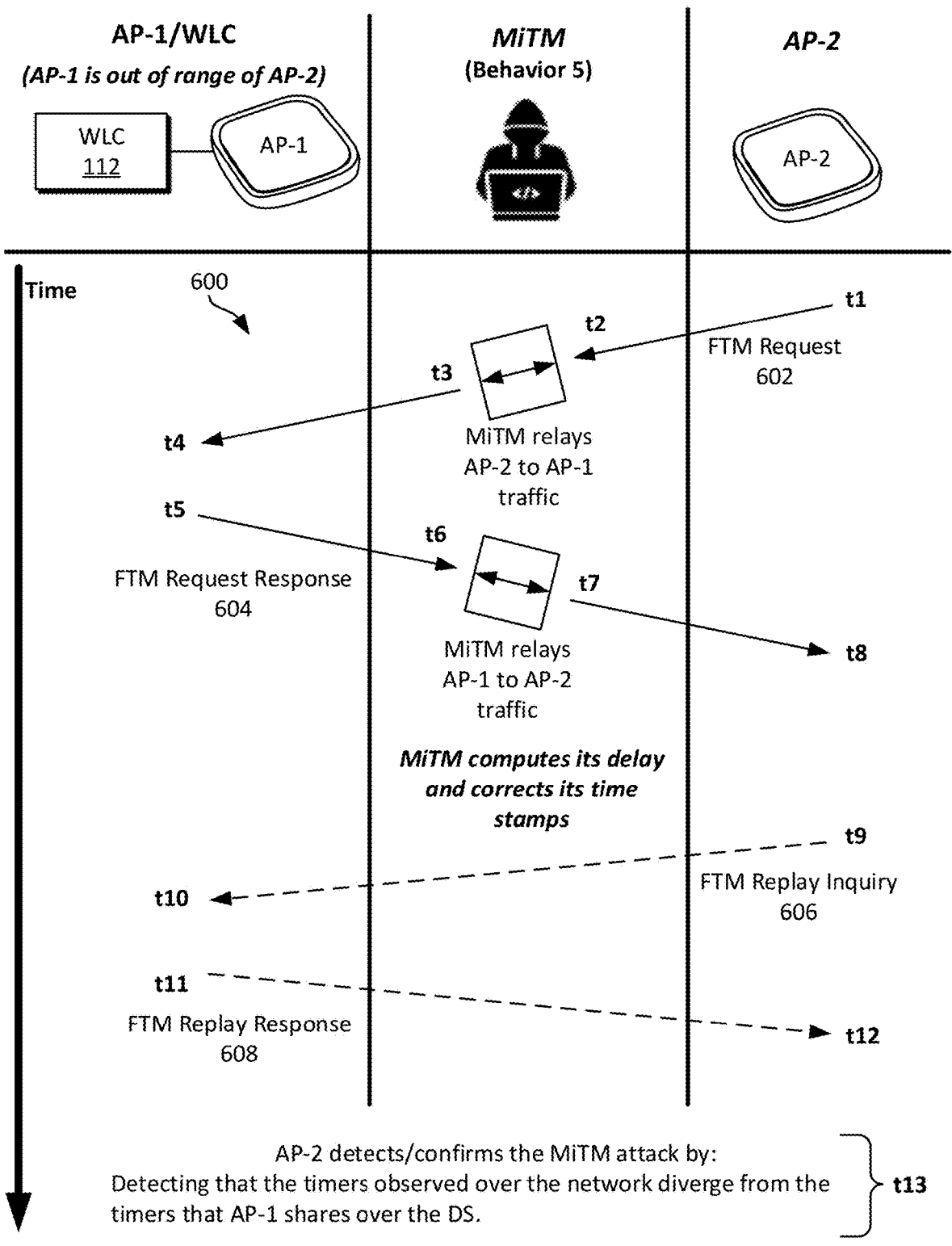
FIG. 6 is a communication timing diagram illustrating a MiTM detection technique using FTM according to a fifth detection implementation to detect a MiTM exhibiting a fifth behavior.

FIG. 6 is a communication timing diagram illustrating the MiTM detection technique using FTM according to a fifth detection implementation to detect a MiTM exhibiting a fifth behavior. In this scenario, the first access point AP-1 is out of range of the second access point AP-2.

In accordance with the fifth detection implementation, at time t1, the second access point AP-2 sends a FTM request 602 to the first access point AP-1 and/or the WLC 112 to initiate a FTM exchange 600. The second access point AP-2 can initiate the FTM exchange with the first access point AP-1, e.g., based at least in part on one or more of the ways disclosed herein.

At time t2, the MiTM attacker 140 receives the FTM request 602 sent by the second access point AP-2, and at time t3, the MiTM attacker 140 relays the FTM request 602 to the first access point AP-1. At time t4, the first access point AP-1 receives the FTM request 602. In this regard, the first access point AP-1 receives the FTM request 602, albeit relayed from the MiTM attacker 140. At time t5, the first access point AP-1 sends a response to the FTM request 602, or rather a FTM request response 604, to the second access point AP-2. However, at time t6, the MiTM attacker 140 receives the FTM request response 604 sent by the first access point AP-2, and at time t7, the MiTM attacker 140 relays the FTM request response 604 to the second access point AP-2. At time t8, the second access point AP-2 receives the FTM request response 604. In this regard, the second access point AP-2 receives the FTM request response 604, albeit relayed from the MiTM attacker 140.

In this scenario in which the MiTM attacker 140 exhibits the fifth behavior, the MiTM attacker 140 computes its delays (its processing and retransmission delays in both directions) and corrects its timestamps accordingly. That is, the MiTM attacker 140 relays the traffic and corrects for the transmission and retransmission delays associated with relaying the FTM request 602 and the FTM request response 604.

As further shown in FIG. 6, at time t9, when the FTM request 602 is relayed by the MiTM attacker 140 from the second access point AP-2 to the first access point AP-1 and the FTM request response 604 is relayed by the MiTM attacker 140 from the first access point AP-1 to the second access point AP-2, and with the first access point AP-1 out of range of the second access point AP-2, the second access point AP-2 provides to the first access point AP-1 and/or the WLC 112, over the DS 120, a FTM replay inquiry 606. The FTM replay inquiry 606 requests a replay of timers and/or frame sequence numbers exchanged over the network 100 that are associated with the FTM exchange, such as a replay of timers and/or frame sequence numbers associated with the FTM request 602 and/or a replay of timers and/or frame sequence numbers associated with the FTM request response 604. At time t10, the first access point AP-1 and/or WLC 112 receives the FTM replay inquiry 606.

At time t11, the first access point AP-1 and/or WLC 112 sends, over the DS 120, a FTM replay response 608 to the second access point AP-2. The FTM replay response 608 includes, among other possible information, a replay of timers and/or frame sequence numbers exchanged over the network 100 that are associated with the FTM exchange. At time t12, the second access point AP-2 receives the FTM replay response 608.

Accordingly, at time t13, the MiTM attack is detected and/or confirmed in response to the second access point AP-2 determining that, despite no delay bias being present (e.g., despite the calculated bias not reaching the threshold bias), the timers and/or the frame sequence numbers exchanged over the network 100 that are associated with the FTM request 602 and/or the response to the FTM request 602 (e.g., the FTM request response 604) diverge from the timers and/or the frame sequence numbers reported by the first access point AP-1 over the DS 120. Thus, FTM information associated with the FTM exchange 400 is used according to the fifth detection implementation to detect the MiTM attacker 140 exhibiting a fifth behavior.

Figure 7:
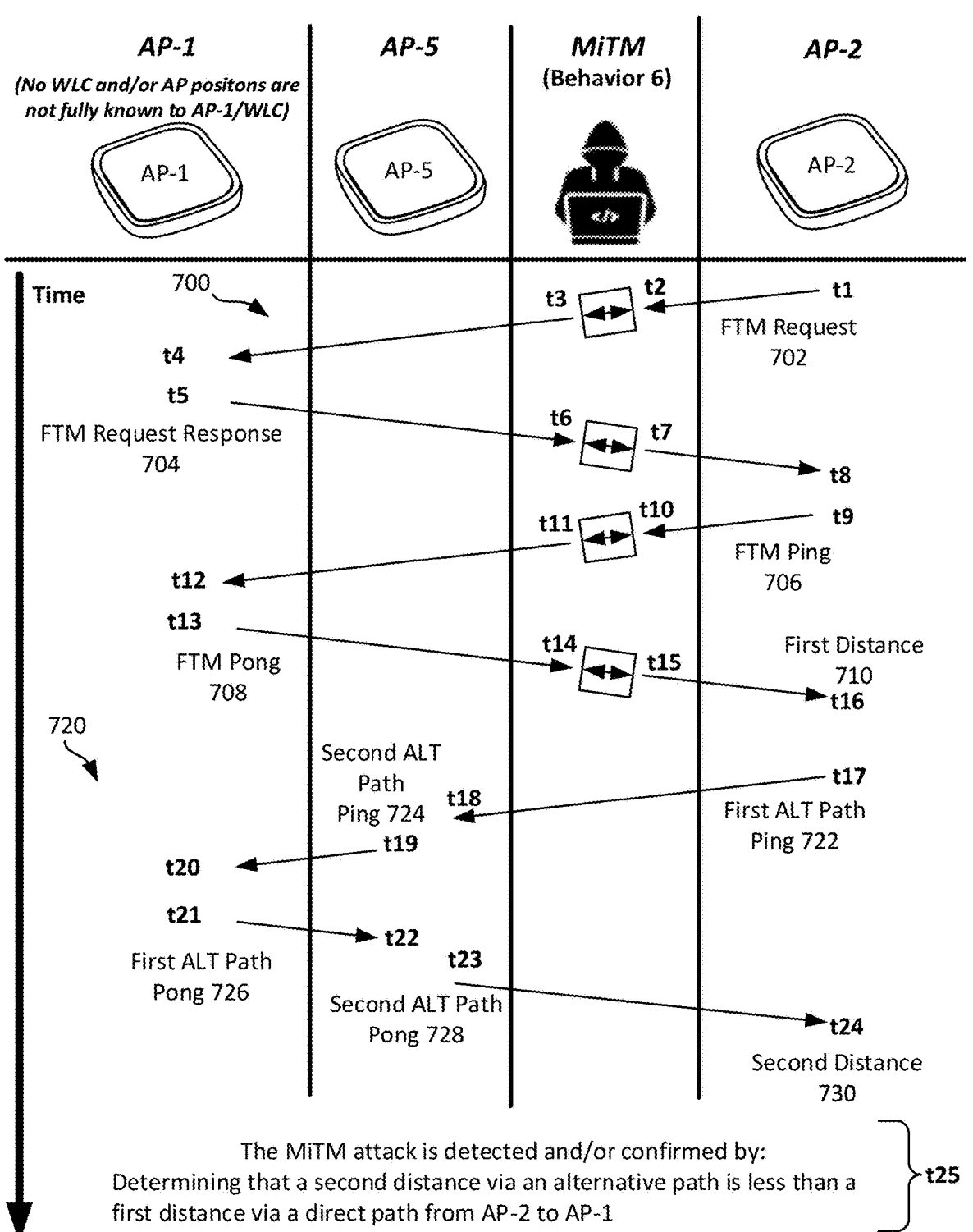
FIG. 7 is a communication timing diagram illustrating a MiTM detection technique using FTM according to a sixth detection implementation to detect a MiTM exhibiting a sixth behavior.

FIG. 7 is a communication timing diagram illustrating the MiTM detection technique using FTM according to a sixth detection implementation to detect a MiTM exhibiting a sixth behavior. In this scenario, the WLC 112 is either not present or locations of the APs 110 of the network 100 are not known to the WLC 112 or the first access point AP-1.

In accordance with the sixth detection implementation, the second access point AP-2 first implements a FTM exchange 700 to determine a first distance 710 between the first access point AP-1 and the second access point AP-2. The second access point AP-2 can initiate the negotiation phase of the FTM exchange 700. Thus, at time t1, the second access point AP-2 sends a FTM request 702 to the first access point AP-1 and/or the WLC 112 (if present) to initiate the FTM exchange 700. The second access point AP-2 can initiate the FTM exchange with the first access point AP-1, e.g., based at least in part on one or more of the ways disclosed herein.

At time t2, the MiTM attacker 140 receives the FTM request 702 sent by the second access point AP-2, and at time t3, the MiTM attacker 140 relays the FTM request 702 to the first access point AP-1. At time t4, the first access point AP-1 receives the FTM request 702. At time t5, the first access point AP-1 sends a response to the FTM request 702, or rather a FTM request response 704, to the second access point AP-2. However, at time t6, the MiTM attacker 140 receives the FTM request response 704 sent by the first access point AP-1, and at time t7, the MiTM attacker 140 relays the FTM request response 704 to the second access point AP-2. At time t8, the second access point AP-2 receives the FTM request response 704.

With the FTM request 702 sent and the FTM request response 704 received, albeit both relayed by the MiTM attacker 140, the negotiation phase is complete and the second access point AP-2 initiates the measurement phase of the FTM exchange 700. Particularly, the second access point AP-2 proceeds with the FTM protocol to perform a distance check between itself and the first access point AP-1. In this way, the first distance 710 can be determined. The first distance 710 is calculated using a direct path between the second access point AP-2 and the first access point AP-1, or at least a path that is known to be shorter than a second distance to be determined as described below. Specifically, at time t9, the second access point AP-2 can send a FTM ping 706 to the first access point AP-1. At time t10, the MiTM attacker 140 receives the FTM ping 706 sent by the second access point AP-2, and at time t11, the MiTM attacker 140 relays the FTM ping 706 to the first access point AP-1. At time t12, the first access point AP-1 receives the FTM ping 706. At time t13, the first access point AP-1 sends a response to the FTM ping 706, or rather a FTM pong 708, to the second access point AP-2. However, at time t14, the MiTM attacker 140 receives the FTM pong 708 sent by the first access point AP-1, and at time t15, the MiTM attacker 140 relays the FTM pong 708 to the second access point AP-2. At time t16, the second access point AP-2 receives the FTM pong 708. Based at least in part on the Time of Flight (TOF) of the FTM ping 706 and the FTM pong 708, the second access point AP-2 calculates the first distance 710, which as noted above, is a distance calculated using a direct path between the second access point AP-2 and the first access point AP-1, or at least a path that is known to be shorter than a second distance to be determined as described below. With the first distance 710 determined, a termination phase (not shown) can be completed to terminate the FTM exchange 700 between the first access point AP-1 and the second access point AP-2.

With the first distance 710 determined, the second access point AP-2 next calculates a second distance 730, or rather a distance calculated using an indirect or alternative path between the second access point AP-2 and the first access point AP-1. The alternative path includes at least one other node in the path that is not the first access point AP-1 or the second access point AP-2. The "other" node can be an AP or a non-AP STA (e.g., a client). In FIG. 7, the fifth access point AP-5 is the "other" node used to form an alternative path, e.g., AP-2 to AP-5 to AP-1, and for return transmissions, AP-1 to AP-5 to AP-2; see also FIG. 1.

Accordingly, at time t17, the second access point AP-2 can initiate a measurement phase of a FTM exchange 720 by sending a first alternative path FTM ping, or first ALT path ping 722 (which can be done after a negotiation phase or series of FTM requests and responses between the first, second, and fifth access points AP-1, AP-2, AP-5). At time t18, the fifth access point AP-5 receives the first ALT path ping 722, and at time t19, the fifth access point AP-5 sends a second alternative path FTM ping, or second ALT path ping 724, to the first access point AP-1. At time t20, the first access point AP-1 receives the second ALT path ping 724.

At time t21, the first access point AP-1 sends a first alternative path FTM pong, or first ALT path pong 726. At time t22, the fifth access point AP-5 receives the first ALT path pong 726, and at time t23, the fifth access point AP-5 sends a second alternative path FTM pong, or second ALT path pong 728 to the second access point AP-2. At time t24, the second access point AP-2 receives the second ALT path pong 728. Based at least in part on the TOF of the first and second ALT path pings 722, 724 and the first and second ALT path pongs 726, 728, the second access point AP-2 calculates the second distance 730, which as noted above, is a distance calculated using an alternative path between the second access point AP-2 and the first access point AP-1.

Accordingly, at time 25, the second access point AP-2 can compare the first distance 710 calculated using a direct path and the second distance 730 using the alternative path. When the second distance 730 associated with the alternative path is equal to or shorter than the first distance 710 associated with the direct path, the MiTM attack is detected and/or confirmed. In some instances, when a MiTM attacker is present, the second distance 730 associated with the alternative path will be shorter than the first distance 710 associated with the direct path, which can result in an absurd triangle via the triangle inequality theorem. Thus, FTM information associated with the FTM exchanges 700, 720 is used according to the sixth detection implementation to detect the MiTM attacker 140 exhibiting a sixth behavior.

In some instances in executing the sixth detection implementation, when the second distance 730 associated with the alternative path is within a predetermined range of the first distance 710 associated with the direct path, the MiTM attack is detected and/or confirmed. For instance, even if the first distance 710 associated with the direct path is shorter than the second distance 730 associated with the alternative path, if the second distance 730 is too close to the first distance 710, or within the predetermined range, the MiTM attack is detected and/or confirmed, e.g., because the distances being too close can present an impossible or very unlikely result.

Further, it will be appreciated that the alternative path provided above is but one example of an alternative path. Other alternative paths are possible. For instance, one another example alternative path can include, with reference to FIGS. 1, AP-2 to AP-4 to AP-3 to AP-1, and for return transmissions, AP-1 to AP-3 to AP-4 to AP-2. In some instances, the first distance 710 can be compared to multiple "second" distances each determined using a different alternative path. Such an implementation can be strategically employed for confirming the results of a comparison of the direct path distance and another alternative path distance, for ensuring that the MiTM attacker 140 or another MiTM is not present in the alternative path, and/or where multiple MiTM attackers are working in concert with one another.

In yet other embodiments, instead of the second access point AP-2 initiating a FTM exchange as in the implementations described above, the first access point AP-1 can initiate the FTM exchange. The various implementations of the MiTM detection technique set forth still are applicable in such embodiments. In yet further embodiments, an AP can initiate a FTM exchange with a client, e.g., the client 130 in FIG. 1. The various implementations of the MiTM detection technique set forth still are applicable in such embodiments.

Figure 8:
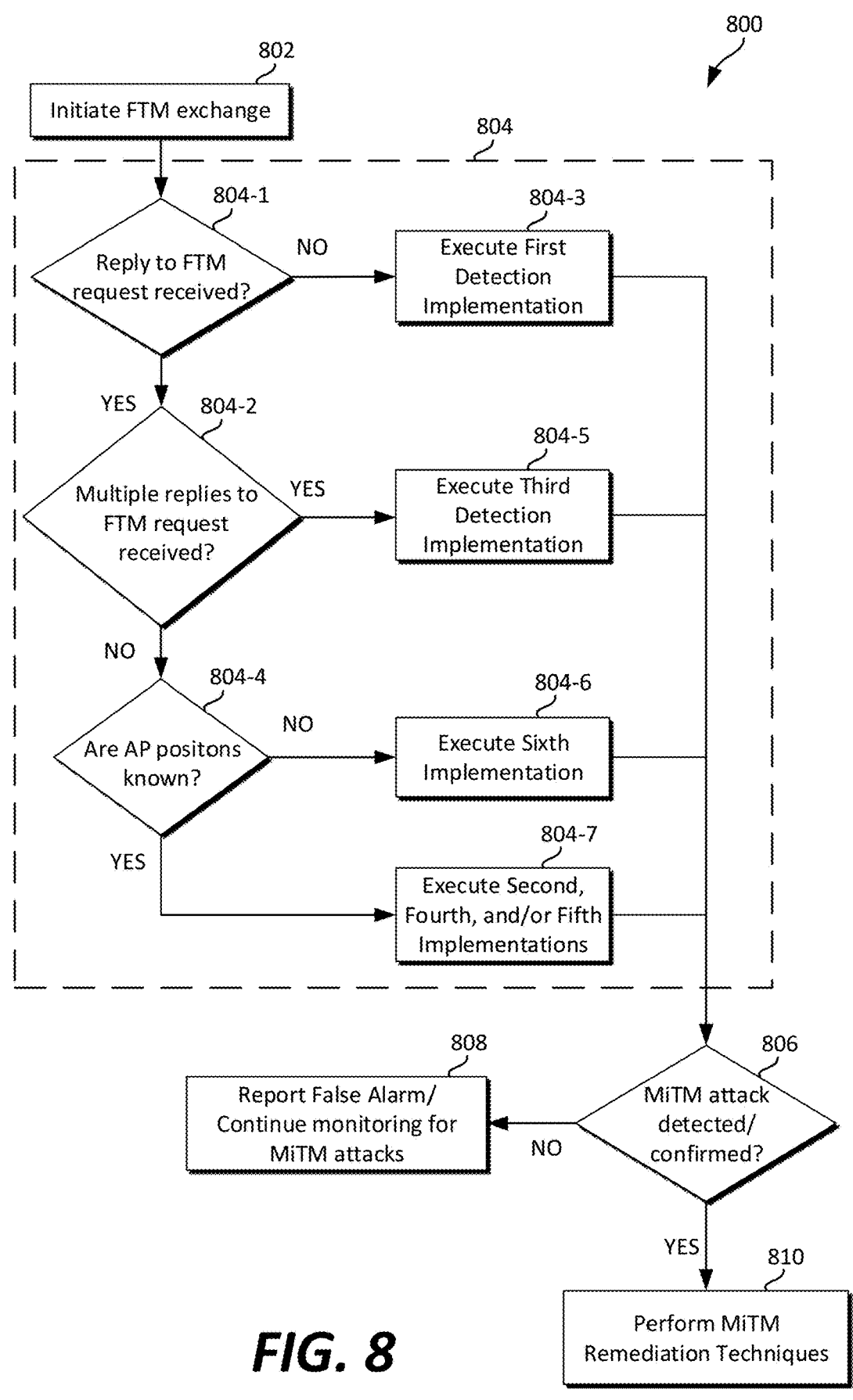
FIG. 8 is a flow diagram for a method of detecting and/or confirming a MiTM attack according to one or more embodiments.

FIG. 8 is a flow diagram for a method 800 of detecting and/or confirming a MiTM attack according to one or more embodiments.

At 802, the method 800 can include initiating a FTM exchange between a second station and a first station to detect or confirm a MiTM attack in a network in which a MiTM is positioned between the first station and a third station. For instance, the first station can be an AP, the second station can be an AP. The third station can be an AP or a non-AP STA, for example. The FTM exchange can be initiated by the first station or the second station, for example. The FTM exchange can be initiated by one of the stations sending a FTM request. For instance, in some implementations, initiating the FTM exchange can include sending, by the second station, a FTM request to the first station. The station initiating the FTM exchange, or the initiator, can have one or more processors and one or more memory devices, such as one or more non-transitory computer readable medium. Instructions can be stored on the one or more memory devices, and when executed by the one or more processors, the one or more processors can be caused to perform an operation, such as a MiTM detection technique using FTM as disclosed herein. The responder, or receiving station of the FTM request, can be configured in a similar manner.

In some implementations, the second station is positioned relative to the third station such that communications between the first station and the third station are overheard by the second station. The FTM exchange can be initiated at 802 in response to the second station overhearing the communications between the first station and the third station, e.g., particularly where the communications indicate suspicious activity.

At 804, the method 800 can include detecting or confirming, or both, the MiTM attack based at least in part on FTM information determined during the FTM exchange. Based on a behavior of the MiTM attacker, the instructions, when executed by one or more processors of a station attempting to detect or confirm a MiTM attack, can cause the one or more processors to implement one of a plurality of detection implementations or schemes to detect or confirm a MiTM attack at 804. An example manner in which a detection implementation can be selected and executed is provided below with reference to blocks 804-1 through 804-7.

At 804-1, the method 800 can include determining whether a reply (e.g., an acknowledgement or FTM request reply) to the FTM request is received. When a reply is received by the initiator, the method 800 can proceed to 804-2. When no reply is received by the initiator (the station that sent the FTM request), the method 800 can proceed to 804-3 where the first detection implementation can be executed (e.g., the detection implementation provided above with reference to FIG. 2). Particularly, when no response to the FTM request is received by the initiator (e.g., the second station), and the first and second stations are out of range, detecting or confirming the MiTM attack based at least in part on the FTM information determined during the FTM exchange can include receiving, by the second station in response to a FTM capability inquiry and over a distribution system, a FTM capability response that includes the FTM information. The MiTM attack can be detected or confirmed, or both, in response to the second access point determining at least one of: i) the first station is capable of FTM as indicated by the FTM capability response and thus should have replied to the FTM request, but did not; or ii) the first station did not receive the FTM request, as confirmed by the FTM capability response, despite a signal level of the MiTM implying that communication exchanges between the second station and the first station should be possible over the network.

At 804-2, the method 800 can include determining whether multiple replies (e.g., multiple acknowledgements or FTM request replies) to the FTM request are received. When multiply replies are not received by the initiator, the method 800 can proceed to 804-4. When multiply replies are received by the initiator, the method 800 can proceed to 804-5 where the third detection implementation can be executed (e.g., the detection implementation provided above with reference to FIG. 4). Specifically, in some embodiments, when a response to the FTM request is received by the initiator (e.g., the second station) from the MiTM and from the responder (e.g., the first station), and the first station is in range of the second station, the MiTM attack is detected or confirmed, or both, in response to the second station determining that multiple responses to the FTM request have been received by the second station. In other embodiments, when a response to the FTM request is received by the initiator (e.g., the second station) from the MiTM and from the responder (e.g., the first station), and the first station is in range of the second station, detecting or confirming the MiTM attack based at least in part on the FTM information can include receiving, by the initiator (e.g., the second station) in response to a FTM replay inquiry and over a distribution system, a FTM replay response that includes the FTM information, the FTM replay response includes at least one of a replay of timers or frame sequence numbers exchanged over the network that are associated with the FTM exchange, and wherein the MiTM attack is detected or confirmed, or both, in response to the initiator (e.g., the second station) determining, based at least in part on the FTM replay response, that at least one of the frame sequence numbers or the timers mismatch those heard over the network by the initiator (e.g., the second station).

At 804-4, the method 800 can include determining whether the position of the stations (e.g., APs) of the network are known. When the positions of the stations are known, the method 800 can proceed to 804-7. When the positions of the stations are not known (e.g., the positions of the first and second stations), the method 800 can proceed to 804-6 where the sixth detection implementation can be executed (e.g., the detection implementation provided above with reference to FIG. 7). Specifically, when the FTM request is relayed by the MiTM from the initiator (e.g., the second station) to the responder (e.g., the first station) and a response to the FTM request is relayed by the MiTM from the responder (e.g., the first station) to the initiator (e.g., the second station), and the first station is out of range of the second station and wherein the first station does not have an associated controller or locations of stations of the network are not known to the controller or the first station, detecting or confirming the MiTM attack based at least in part on the FTM information can include determining a first distance via the FTM exchange. The first distance is a distance calculated using a direct path between the second station and the first station or a distance that is less than a second distance calculated using an alternative path; determining, via a second FTM exchange, the second distance, the second distance is calculated using the alternative path that includes at least one node that is not the first station or the second station and that is known to be longer than the direct path; and comparing the first distance with the second distance. When the second distance is equal to, shorter than, or within a predetermined range of the first distance as determined by the comparing, the MiTM attack is detected or confirmed.

At 804-7, one of three detection techniques can be implemented, including the second, fourth, and/or fifth detection techniques. They can be implemented serially or in parallel.

In executing the second detection technique at 804-7, when a response to the FTM request is received by the initiator (e.g., the second station) from the MiTM and the first station is out of range of the second station, detecting or confirming the MiTM attack based at least in part on the FTM information can include receiving, by the initiator (e.g., the second station) in response to a FTM replay inquiry and over a distribution system, a FTM replay response that includes the FTM information, the FTM replay response includes at least one of a replay of timers or frame sequence numbers exchanged over the network that are associated with the FTM exchange. The MiTM attack can be detected or confirmed, or both, in response to the initiator (e.g., the second station) determining at least one of: i) the first station did not actually respond to the FTM request over the network based at least in part on the FTM replay response indicating that the first station does not contain frames or timers indicating a response to the FTM request was sent by the first station; or ii) at least one of the frame sequence numbers or the timers mismatch those heard over the network by the second station.

In executing the fourth detection technique at 804-7, when the FTM request is relayed by the MiTM from the initiator (e.g., the second station) to the responder (e.g., the first station) and a response to the FTM request is relayed by the MiTM from the responder (e.g., the first station) to the initiator (e.g., the second station), and the first station is out of range of the second station, detecting or confirming the MiTM attack based at least in part on the FTM information can include providing, over a distribution system and from the initiator (e.g., the second station) to the responder (e.g., the first station) or a controller associated with the responder (e.g., the first station), or both, an FTM replay log, the FTM replay including the FTM information, including at least one of a replay of timers or frame sequence numbers associated with the FTM request and the response to the FTM request exchanged over the network that were overheard by the initiator (e.g., the second station). The MiTM attack is detected or confirmed, or both, in response to the first station, the controller, or both, determining, based at least in part on the FTM replay log, that a calculated bias, which is determined based at least in part on the replay of at least one of the timers or the frame sequence numbers, has reached a threshold bias.

In executing the fifth detection technique at 804-7, when the FTM request is relayed by the MiTM from the initiator (e.g., the second station) to the responder (e.g., the first station) and a response to the FTM request is relayed by the MiTM from the responder (e.g., the first station) to the second initiator (e.g., the second station), and the first station is out of range of the second station, detecting or confirming the MiTM attack based at least in part on the FTM information can include receiving, by the second station in response to a FTM replay inquiry and over a distribution system, a FTM replay response that includes the FTM information. The FTM replay response can include at least one of a replay of timers or frame sequence numbers exchanged over the network that are associated with the FTM exchange. The MiTM attack can be detected or confirmed, or both, in response to the second station determining that, despite no delay bias being present or a calculated bias not reaching a threshold bias, that at least one of timers or frame sequence numbers exchanged over the network that are associated with the FTM exchange as overheard by the second station diverge, respectively, from at least one of the timers or the frame sequence numbers reported by the first station via the FTM replay response.

At 806, the method 800 can include determining whether a MiTM was detected and/or confirmed at 804. When a MiTM attack was not detected and/or confirmed at 804, the method 800 proceeds to 810. When a MiTM attack was detected and/or confirmed at 804, the method 800 proceeds to 810.

At 808, the method 800 can include, when no MiTM attack was detected or confirmed, reporting a false alarm and/or continuing to monitor for MiTM attacks using FTM. For instance, the STA that determines that no MiTM attack is present can broadcast to the other STAs of the network that the STA suspected of being a MiTM is actually valid. In addition, one or more STAs of the network can continue monitoring for MiTM attacks using FTM, e.g., via routine FTM checks, a random sampling algorithm when an FTM session is executed, based on suspicious activity, etc.

At 810, the method 800 can include, when a MiTM attack was detected and/or confirmed, performing one or more MiTM remediation techniques. Example remediation techniques can include, without limitation, overloading or containing the MiTM attacker, duplicating the invalid responses with spoofed responses with large bias to cause the STAs of the network to ignore the MiTM, and/or other protection measures can be activated while an alarm is raised about the presence of the MiTM attack. Other remediation techniques are contemplated.

Accordingly, the method 800 provides a MiTM detection technique using FTM that can be implemented to detect a MiTM capable of exhibiting many different possible behaviors, such as at least sixth different possible behaviors.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   initiating a fine timing measurement (FTM) exchange between a second station and a first station to detect or confirm a man-in-the-middle (MiTM) attack in a network in which a MiTM is positioned between the first station and a third station, wherein initiating the FTM exchange comprises sending, by the second station, a FTM request to the first station; and
   detecting or confirming, or both, the MiTM attack based at least in part on FTM information determined during the FTM exchange, wherein when no response to the FTM request is received by the second station and the first station is out of range of the second station, detecting or confirming the MiTM attack based at least in part on the FTM information determined during the FTM exchange comprises:
   receiving, by the second station in response to a FTM capability inquiry and over a distribution system, a FTM capability response that includes the FTM information.

2. The method of claim 1, wherein the first station is an access point and the second station is an access point.

3. The method of claim 1, wherein the second station is positioned relative to the third station such that communications between the first station and the third station are overheard by the second station, and
   wherein the FTM exchange is initiated in response to the second station overhearing the communications between the first station and the third station.

4. The method of claim 1,
   wherein the MiTM attack is detected or confirmed, or both, in response to the second station determining at least one of:
      i) the first station is capable of FTM as indicated by the FTM capability response and thus should have replied to the FTM request, but did not; or
      ii) the first station did not receive the FTM request, as confirmed by the FTM capability response, despite a signal level of the MiTM implying that communication exchanges between the second station and the first station should be possible over the network.

5. The method of claim 1,
   wherein when a response to the FTM request is received by the second station from the MiTM and the first station is out of range of the second station, detecting or confirming the MiTM attack based at least in part on the FTM information comprises:
   receiving, by the second station in response to a FTM replay inquiry and over a distribution system, a FTM replay response that includes the FTM information, the FTM replay response includes at least one of a replay of timers or frame sequence numbers exchanged over the network that are associated with the FTM exchange, and
   wherein the MiTM attack is detected or confirmed, or both, in response to the second station determining at least one of:
      i) the first station did not actually respond to the FTM request over the network based at least in part on the FTM replay response indicating that the first station does not contain frames or timers indicating a response to the FTM request was sent by the first station; or
      ii) at least one of the frame sequence numbers or the timers mismatch those heard over the network by the second station.

6. The method of claim 1,
   wherein when a response to the FTM request is received by the second station from the MiTM and from the first station, and the first station is in range of the second station, the MiTM attack is detected or confirmed, or both, in response to the second station determining that multiple responses to the FTM request have been received by the second station.

7. The method of claim 1,
   wherein when a response to the FTM request is received by the second station from the MiTM and from the first station, and the first station is in range of the second station, detecting or confirming the MiTM attack based at least in part on the FTM information comprises:

receiving, by the second station in response to a FTM replay inquiry and over a distribution system, a FTM replay response that includes the FTM information, the FTM replay response includes at least one of a replay of timers or frame sequence numbers exchanged over the network that are associated with the FTM exchange, and wherein the MiTM attack is detected or confirmed, or both, in response to the second station determining, based at least in part on the FTM replay response, that at least one of the frame sequence numbers or the timers mismatch those heard over the network by the second station.

8. The method of claim 1, wherein when the FTM request is relayed by the MiTM from the second station to the first station and a response to the FTM request is relayed by the MiTM from the first station to the second station, and the first station is out of range of the second station, detecting or confirming the MiTM attack based at least in part on the FTM information comprises:

providing, over a distribution system and from the second station to the first station or a controller associated with the first station, or both, an FTM replay log, the FTM replay including the FTM information, including at least one of a replay of timers or frame sequence numbers associated with the FTM request and the response to the FTM request exchanged over the network that were overheard by the second station, and wherein the MiTM attack is detected or confirmed, or both, in response to the first station, the controller, or both, determining, based at least in part on the FTM replay log, that a calculated bias, which is determined based at least in part on the replay of at least one of the timers or the frame sequence numbers, has reached a threshold bias.

9. The method of claim 1, wherein when the FTM request is relayed by the MiTM from the second station to the first station and a response to the FTM request is relayed by the MiTM from the first station to the second station, and the first station is out of range of the second station, detecting or confirming the MiTM attack based at least in part on the FTM information comprises:

receiving, by the second station in response to a FTM replay inquiry and over a distribution system, a FTM replay response that includes the FTM information, the FTM replay response includes at least one of a replay of timers or frame sequence numbers exchanged over the network that are associated with the FTM exchange, and wherein the MiTM attack is detected or confirmed, or both, in response to the second station determining that, despite no delay bias being present or a calculated bias not reaching a threshold bias, that at least one of timers or frame sequence numbers exchanged over the network that are associated with the FTM exchange as overheard by the second station diverge, respectively, from at least one of the timers or the frame sequence numbers reported by the first station via the FTM replay response.

10. The method of claim 1, wherein when the FTM request is relayed by the MiTM from the second station to the first station and a response to the FTM request is relayed by the MiTM from the first station to the second station, and the first station is out of range of the second station and wherein the first station does not have an a controller associated therewith or locations of stations of the network are not known to the controller or the first station, detecting or confirming the MiTM attack based at least in part on the FTM information comprises:

determining a first distance via the FTM exchange, the first distance is a distance calculated using a direct path between the second station and the first station or a distance that is less than a second distance calculated using an alternative path;

determining, via a second FTM exchange, the second distance, the second distance is calculated using the alternative path that includes at least one node that is not the first station or the second station and that is known to be longer than the direct path; and comparing the first distance with the second distance, and wherein when the second distance is equal to, shorter than, or within a predetermined range of the first distance as determined by the comparing, the MiTM attack is detected or confirmed.

11. A non-transitory, computer readable medium comprising instructions that, when executed by one or more processors, cause the one or more processors to perform an operation, the operation comprising:

initiating a fine timing measurement (FTM) exchange between a second station and a first station to detect or confirm a man-in-the-middle (MiTM) attack in a network in which a MiTM is positioned between the first station and a third station, wherein initiating the FTM exchange comprises sending, by the second station, a FTM request to the first station; and detecting or confirming, or both, the MiTM attack based at least in part on FTM information determined during the FTM exchange, wherein when no response to the FTM request is received by the second station and the first station is out of range of the second station, detecting or confirming the MiTM attack based at least in part on the FTM information determined during the FTM exchange comprises:

receiving, by the second station in response to a FTM capability inquiry and over a distribution system, a FTM capability response that includes the FTM information.

12. The non-transitory, computer readable medium of claim 11, wherein the MiTM attack is detected or confirmed, or both, in response to the second station determining at least one of:

i) the first station is capable of FTM as indicated by the FTM capability response and thus should have replied to the FTM request, but did not; or ii) the first station did not receive the FTM request, as confirmed by the FTM capability response, despite a signal level of the MiTM implying that communication exchanges between the second station and the first station should be possible over the network.

13. The non-transitory, computer readable medium of claim 11, wherein when a response to the FTM request is received by the second station from the MiTM and the first station is out of range of the second station, detecting or confirming the MiTM attack based at least in part on the FTM information comprises:

receiving, by the second station in response to a FTM replay inquiry and over a distribution system, a FTM replay response that includes the FTM information, the FTM replay response includes at least one of a replay of timers or frame sequence numbers exchanged over the network that are associated with the FTM exchange, and wherein the MiTM attack is detected or confirmed, or both, in response to the second station determining at least one of:

i) the first station did not actually respond to the FTM request over the network based at least in part on the FTM replay response indicating that the first station does not contain frames or timers indicating a response to the FTM request was sent by the first station; or ii) at least one of the frame sequence numbers or the timers mismatch those heard over the network by the second station.

14. The non-transitory, computer readable medium of claim 11, wherein when a response to the FTM request is received by the second station from the MiTM and from the first station, and the first station is in range of the second station, and wherein the MiTM attack is detected or confirmed, or both, in response to the second station determining that multiple responses to the FTM request have been received by the second station.

15. The non-transitory, computer readable medium of claim 11, wherein when a response to the FTM request is received by the second station from the MiTM and from the first station, and the first station is in range of the second station, detecting or confirming the MiTM attack based at least in part on the FTM information comprises:

receiving, by the second station in response to a FTM replay inquiry and over a distribution system, a FTM replay response that includes the FTM information, the FTM replay response includes at least one of a replay of timers or frame sequence numbers exchanged over the network that are associated with the FTM exchange, and wherein the MiTM attack is detected or confirmed, or both, in response to the second station determining, based at least in part on the FTM replay response, that at least one of the frame sequence numbers or the timers mismatch those heard over the network by the second station.

16. The non-transitory, computer readable medium of claim 11, wherein when the FTM request is relayed by the MiTM from the second station to the first station and a response to the FTM request is relayed by the MiTM from the first station to the second station, and the first station is out of range of the second station, detecting or confirming the MiTM attack based at least in part on the FTM information comprises:

providing, over a distribution system and from the second station to the first station or a controller associated with the first station, or both, an FTM replay log, the FTM replay including the FTM information, including at least one of a replay of timers or frame sequence numbers associated with the FTM request and the response to the FTM request exchanged over the network that were overheard by the second station, and wherein the MiTM attack is detected or confirmed, or both, in response to the first station, the controller, or both, determining, based at least in part on the FTM replay log, that a calculated bias, which is determined based at least in part on the replay of at least one of the timers or the frame sequence numbers, has reached a threshold bias.

17. The non-transitory, computer readable medium of claim 11, wherein when the FTM request is relayed by the MiTM from the second station to the first station and a response to the FTM request is relayed by the MiTM from the first station to the second station, and the first station is out of range of the second station, detecting or confirming the MiTM attack based at least in part on the FTM information comprises:

receiving, by the second station in response to a FTM replay inquiry and over a distribution system, a FTM replay response that includes the FTM information, the FTM replay response includes at least one of a replay of timers or frame sequence numbers exchanged over the network that are associated with the FTM exchange, and wherein the MiTM attack is detected or confirmed, or both, in response to the second station determining that, despite no delay bias being present or a calculated bias not reaching a threshold bias, that at least one of timers or frame sequence numbers exchanged over the network that are associated with the FTM exchange as overheard by the second station diverge, respectively, from at least one of the timers or the frame sequence numbers reported by the first station via the FTM replay response.

18. The non-transitory, computer readable medium of claim 11, wherein when the FTM request is relayed by the MiTM from the second station to the first station and a response to the FTM request is relayed by the MiTM from the first station to the second station, and the first station is out of range of the second station and wherein the first station does not have a controller associated therewith or locations of stations of the network are not known to the controller or the first station, detecting or confirming the MiTM attack based at least in part on the FTM information comprises:

determining a first distance via the FTM exchange, the first distance is a distance calculated using a direct path between the second station and the first station or a distance that is less than a second distance calculated using an alternative path;

determining, via a second FTM exchange, the second distance, the second distance is calculated using the alternative path that includes at least one node that is not the first station or the second station and that is known to be longer than the direct path; and comparing the first distance with the second distance, and wherein when the second distance is equal to, shorter than, or within a predetermined range of the first distance as determined by the comparing, the MiTM attack is detected or confirmed.

19. The non-transitory, computer readable medium of claim 11, wherein the first station is an access point, the second station is an access point, and the third station is a non-access point station.

20. A station, comprising:

a processor; and a memory storing a program executable by the processor to perform an operation, the operation comprising:

initiating a fine timing measurement (FTM) exchange between the station and a first station to detect or confirm a man-in-the-middle (MiTM) attack in a network in which a MiTM is positioned between the first station and a third station, wherein initiating the FTM exchange comprises sending, by the first station, a FTM request to the station; and detecting or confirming the MiTM attack based at least in part on FTM information associated with the FTM exchange, the FTM information being transmitted over a distribution system between the station and the first station or a controller associated with the first station, wherein when the FTM request is relayed by the MiTM from the first station to the station and a response to the FTM request is relayed by the MiTM from the station to the first station, and the station is out of range of the first station and wherein the station does not have an a controller associated therewith or locations of stations of the network are not known to the controller or the station, detecting or confirming the MiTM attack based at least in part on the FTM information comprises:

determining a first distance via the FTM exchange, the first distance is a distance calculated using a direct path between the first station and the station or a distance that is less than a second distance calculated using an alternative path;

determining, via a second FTM exchange, the second distance, the second distance is calculated using the alternative path that includes at least one node that is not the station or the first station and that is known to be longer than the direct path; and comparing the first distance with the second distance, and wherein when the second distance is equal to, shorter than, or within a predetermined range of the first distance as determined by the comparing, the MiTM attack is detected or confirmed.

* * * * *